UNITED STATES PATENT OFFICE.

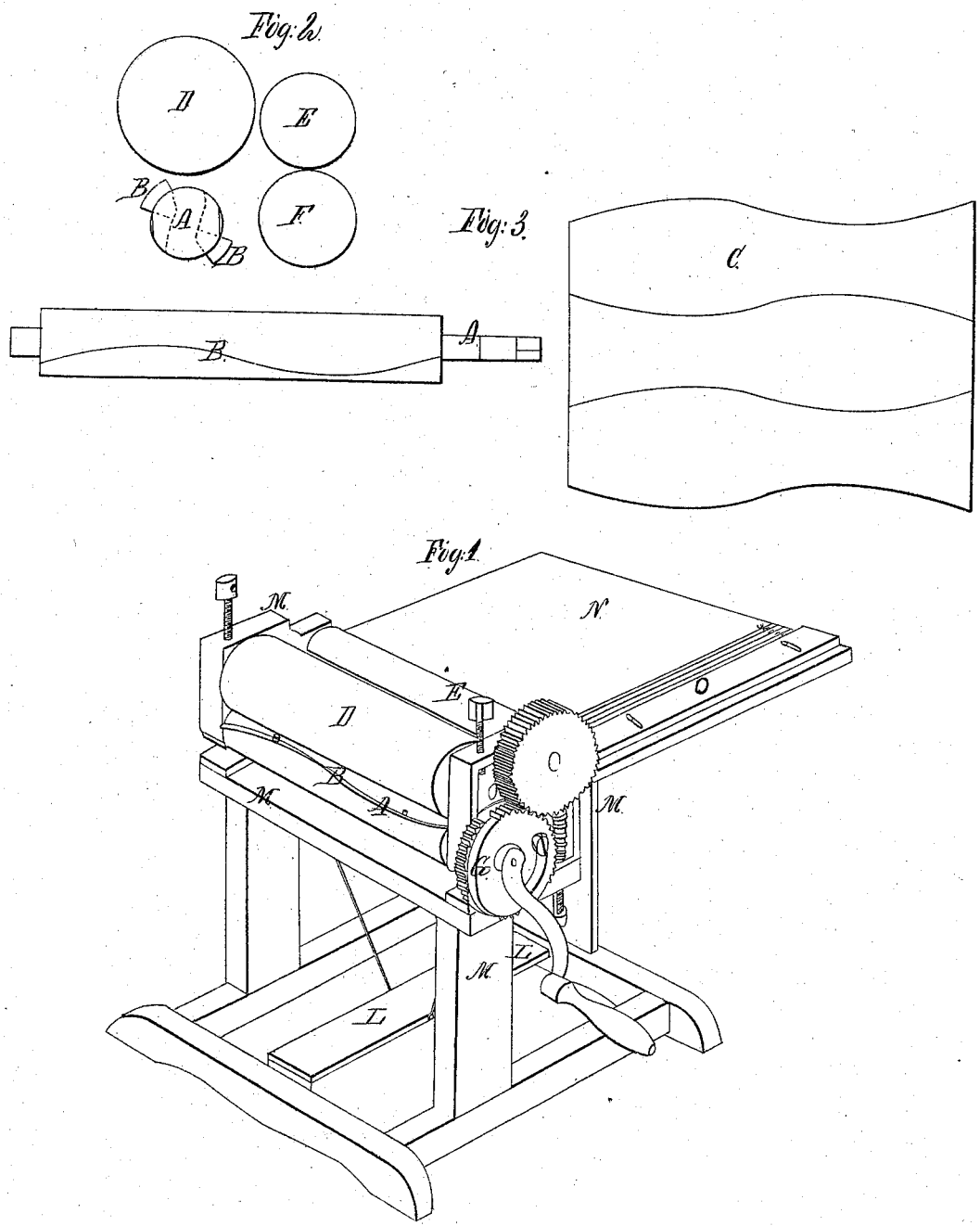

LUTHER ROSS AND POTTER G. ROSS, OF WORCESTER, MASSACHUSETTS.

MACHINE FOR CUTTING BOOT AND SHOE SOLES.

Specification of Letters Patent No. 11,495, dated August 8, 1854.

*To all whom it may concern:*

Be it known that we, LUTHER Ross and POTTER G. Ross, of the city and county of Worcester and State of Massachusetts, have invented a new and useful Machine for Cutting Soles for Boots and Shoes; and we do hereby declare that the following is a full, clear, and exact description of the construction and operation of the same, reference being had to the drawings herewith presented, making a part of this specification, in which—

Figure 1 is a perspective view, Fig. 2 a section of the rolls and cutter and Fig. 3 the cutter and representation of the work cut.

Our invention consists in placing the curved knives on an axis so that their cutting edges shall correspond to portions of the surface of a cylinder and placing a surface for them to impinge against between which the stock or leather to be cut is fed by the feed apparatus so arranged as to feed the exact width of a sole between the revolution of the knives.

To enable others to make and use our invention we proceed to describe its construction and operation.

Our machine consists of an axis (A) to which are attached the knives B B' of the curve necessary to represent the two sides of the sole as shown at (C). Near this place the cylinder (D) (made of rawhide or wood or any material against which the knives may cut without injury,) with its bearings adjustable by means of screws or wedges to keep it firmly pressed against the knives when they pass, in the immediate vicinity of these place a pair of feed rolls (E and F) which may be fluted or plain one of which has fixed bearings the other movable ones with springs to press it toward the other, and connected by straps or wires to pedal L, the whole to be supported by a suitable frame (M) supporting a table N with guide rail (O) made to set so the different widths required for different sized soles, one of the feed rolls E to be driven by adjustable gear G made of two parts with teeth on parts of the surface one part fastened to the shaft of A and the other held by a screw when set to give the required motion to roll, E, which being less for narrow soles may be set by the marks on one part of the wheel to correspond to the first snath or pointer on the other, on the shaft A we place a crank or pulleys if the machine is to run by belts.

To operate the machine set the guide rail O to correspond to the number to be cut and the parts of the wheel G to the same number cut the leather into strips the exact width of the length of the sole to be cut then by pressing the pedal L place the end of the leather between the rolls E and F keeping one edge of it close to the rail O release the pedal (L) give motion to A which will through its gear and rolls E and F feed the exact quantity between each knife cutting the leather as shown at (C) without any waste, and whenever there are bad places in any part of the leather by pressing the pedal it can be shifted so as to cut the leather to the best advantage. The axis A may be made larger and have more knives and cut against a bed running back and forth on an endless apron without changing our principle of cutting and feeding.

We do not claim the use of any particular curve nor the revolving of the knives between the cutting, but What we do claim as new and desire to secure by Letters Patent is—

1. We claim placing the curved knives upon an axis so that their cutting edges shall correspond to portions of the surface of a cylinder so that a small portion only of the knife is cutting at any one time, for the purpose of cutting soles for boots and shoes, substantially as above set forth and described.

2. We claim the driving of the feed rolls E and F by the adjustable wheel G in combination with the arrangement of the table and guide rail O as described or any other substantially the same.

In witness whereof we have set our hands in presence of two witnesses.

LUTHER ROSS.
POTTER G. ROSS.

Witnesses:
S. H. NEWTON,
JAS. G. ARNOLD.